United States Patent
Woodhouse et al.

(10) Patent No.: US 9,889,769 B2
(45) Date of Patent: *Feb. 13, 2018

(54) SEATING ARRANGEMENT FOR A PASSENGER VEHICLE

(71) Applicant: Ford Global Technologies, LLC, Dearborn, MI (US)

(72) Inventors: David Woodhouse, Troy, MI (US); Torsten Gerhardt, London (GB); Robert Spahl, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/258,392

(22) Filed: Sep. 7, 2016

(65) Prior Publication Data

US 2016/0375799 A1    Dec. 29, 2016

Related U.S. Application Data

(63) Continuation of application No. 14/076,928, filed on Nov. 11, 2013, now Pat. No. 9,446,686.

(51) Int. Cl.
*B60N 2/01* (2006.01)
*B60N 2/44* (2006.01)
*B60R 7/04* (2006.01)

(52) U.S. Cl.
CPC ............ *B60N 2/01* (2013.01); *B60N 2/442* (2013.01); *B60R 7/04* (2013.01)

(58) Field of Classification Search
CPC .................................. B60N 2/20; B60N 2/206
(Continued)

(56) References Cited

U.S. PATENT DOCUMENTS

| 1,078,602 A | 11/1913 | Morgan |
| 1,214,897 A | 2/1917 | Clarke |

(Continued)

FOREIGN PATENT DOCUMENTS

| DE | 19702572 A1 | 2/1998 |
| DE | 19916179 A1 | 10/2000 |

(Continued)

OTHER PUBLICATIONS

Chappell, Dale, "Bugatti Type 23 'Brescia', staggered seating detail, c1926," Feb. 1, 2011 (2 pages), Chappells 10.

(Continued)

*Primary Examiner* — Jason S Morrow
(74) *Attorney, Agent, or Firm* — Vichit Chea; Price Heneveld LLP

(57) ABSTRACT

A vehicle seating assembly includes a front seat and a rear seat, each having a backrest and a squab. The front and rear seats are arranged in a staggered duplex overlapping relationship. A portion of a front edge of the rear seat squab overlaps a portion of a rear edge of the front seat squab. An inboard edge of the rear seat squab overlaps a portion of an inboard edge of the front seat squab. A longitudinal distance measured from a front edge of the front seat squab to a rear edge of the rear seat squab is less than the sum of the longitudinal lengths of the front and rear seat squabs. A transverse distance measured from an outboard edge of the front seat squab to an outboard edge of the rear seat squab is less than the sum of the widths of the front and rear seat squabs.

17 Claims, 5 Drawing Sheets

(58) Field of Classification Search
USPC .............. 296/64, 65.16, 65.17; 297/354.11, 297/354.12, 378.1, 378.11
See application file for complete search history.

(56) References Cited

U.S. PATENT DOCUMENTS

| | | | |
|---|---|---|---|
| 1,372,148 A | 3/1921 | Vincenzo | |
| 1,379,499 A | 5/1921 | Ella | |
| 1,760,422 A | 5/1930 | Mackie | |
| 2,282,342 A | 5/1942 | Preble | |
| 2,710,049 A | 6/1955 | Potocnik | |
| 2,715,040 A | 8/1955 | Rhoads, Sr. | |
| 2,833,334 A | 5/1958 | Hunt, Jr. | |
| 2,839,312 A | 6/1958 | Bela et al. | |
| 3,352,597 A | 11/1967 | Bela et al. | |
| 3,685,854 A | 8/1972 | Cadiou | |
| 3,694,025 A | 9/1972 | Buehrig | |
| 3,807,799 A | 4/1974 | Freedman | |
| 3,985,374 A | 10/1976 | Powaska | |
| 4,218,092 A | 8/1980 | Schach et al. | |
| 4,382,628 A | 5/1983 | Palmgren | |
| 4,489,972 A | 12/1984 | Monzini | |
| 4,558,901 A | 12/1985 | Yokoyama | |
| 4,668,010 A | 5/1987 | Fujiwara | |
| 4,681,344 A | 7/1987 | Majerus | |
| 4,796,913 A | 1/1989 | Amabile et al. | |
| 4,973,017 A | 11/1990 | Takagi | |
| 5,096,256 A | 3/1992 | Mouri | |
| 5,165,756 A | 11/1992 | Baker et al. | |
| 5,433,503 A | 7/1995 | De Filippo | |
| 5,435,624 A | 7/1995 | Bray et al. | |
| 5,456,019 A | 10/1995 | Dowell et al. | |
| 5,553,909 A | 9/1996 | Sacco et al. | |
| 5,620,228 A | 4/1997 | Ito et al. | |
| 5,716,026 A | 2/1998 | Pascasio et al. | |
| 5,737,845 A | 4/1998 | Marasus | |
| 5,878,672 A | 3/1999 | Ostermann et al. | |
| 6,135,548 A | 10/2000 | M Mcguire | |
| 6,609,757 B2 | 8/2003 | Ott et al. | |
| 7,121,623 B2 | 10/2006 | Fujihara et al. | |
| 7,938,488 B2 | 5/2011 | Thiel et al. | |
| 8,267,456 B2 | 9/2012 | Murray | |
| 8,360,497 B2 | 1/2013 | Kokubo et al. | |
| 8,523,281 B2 | 9/2013 | Wahls | |
| 8,888,160 B2 | 11/2014 | Woodhouse et al. | |
| 2005/0138955 A1 | 6/2005 | Okuda et al. | |
| 2007/0052264 A1 | 3/2007 | Lee | |
| 2007/0052275 A1 | 3/2007 | Ghilzai | |
| 2007/0241235 A1 | 10/2007 | Atchison | |
| 2010/0148557 A1 | 6/2010 | Schmitz | |
| 2010/0187580 A1 | 7/2010 | Yang | |
| 2010/0187850 A1 | 7/2010 | Murray | |
| 2011/0012396 A1 | 1/2011 | Laake | |
| 2011/0031780 A1 | 2/2011 | Baumann | |
| 2011/0304191 A1 | 12/2011 | Markel et al. | |
| 2012/0132659 A1 | 5/2012 | Hwang | |
| 2012/0146374 A1 | 6/2012 | Fujiwara | |
| 2012/0267933 A1 | 10/2012 | von Rothkirch un Panthen et al. | |
| 2013/0049425 A1 | 2/2013 | Runde et al. | |
| 2013/0127147 A1 | 5/2013 | Murray | |

FOREIGN PATENT DOCUMENTS

| | | |
|---|---|---|
| DE | 102007060818 A1 | 6/2009 |
| DE | 102009035078 A1 * | 2/2010 |
| DE | 102012006485 A1 | 10/2013 |
| EP | 0669245 A1 | 8/1995 |
| FR | 1323260 A | 4/1963 |
| FR | 2826616 A1 | 1/2003 |
| FR | 2885329 A1 | 11/2006 |
| FR | 2934530 A1 | 2/2010 |
| FR | 2961142 A1 | 12/2011 |
| GB | 1012559 A | 12/1965 |
| GB | 1358783 A | 7/1974 |
| JP | S59184035 A | 4/1986 |
| JP | 2006072222 A | 3/2006 |
| WO | 82000618 A1 | 3/1982 |
| WO | 9903377 A1 | 1/1999 |
| WO | 2008110814 A2 | 9/2008 |
| WO | 2009083773 A1 | 7/2009 |
| WO | 2012010833 A1 | 1/2012 |
| WO | 2013111167 A1 | 8/2013 |

OTHER PUBLICATIONS

Early American automobiles.com, "History of Early American Automobile Industry 1891-1929," date unknown (30 pages).
Honest John, "Volkswagen unveils XL1 concept car," Jan. 25, 2011 (3 pages), honestjohn.co.uk.
Jalopy journal.com, "An Early Factory Hot Rod, The Jesse Vincent Speedster," date unknown (13 pages), Lexis Legal Community.
Madabout News, "MEV announce the new R2," Dec. 12, 2007 (3 pages), Madabout kitcars.com.
Quick, Darren, "Audi urban concept defies conventional categorization," Aug. 9, 2011 (9 pages), GIZMAG.
SAE International, "Devices for Use in Defining and Measuring Vehicle Seating Accommodation," 2014 (1 page).
Taylor, Alfred, "Amazing world of three-wheeled vehicles," Sep. 22, 2011 (18 pages), Judgmental.

* cited by examiner

SEATING ARRANGEMENT FOR A PASSENGER VEHICLE

CROSS-REFERENCE TO RELATED APPLICATIONS

This application is a continuation of and claims priority to U.S. patent application Ser. No. 14/076,928 (now U.S. Pat. No. 9,446,686), entitled "SEATING ARRANGEMENT FOR A PASSENGER VEHICLE," filed on Nov. 11, 2013. This application is also related to U.S. Pat. No. 9,102,243, filed Nov. 11, 2013, entitled "SEATING ARRANGEMENT FOR A PASSENGER VEHICLE"; U.S. patent application Ser. No. 14/076,942 (now U.S. Pat. No. 9,511,694), filed Nov. 11, 2013, entitled "MOTOR VEHICLE SEAT HAVING AN ARMREST"; U.S. Pat. No. 8,973,966, filed Nov. 11, 2013, entitled "SEATING ARRANGEMENT FOR A PASSENGER VEHICLE"; U.S. Pat. No. 8,950,796, filed Nov. 11, 2013, entitled "SEATING ARRANGEMENT FOR A PASSENGER VEHICLE"; and U.S. Pat. No. 8,888,160, filed Nov. 11, 2013, entitled "SEATING ARRANGEMENT FOR A PASSENGER VEHICLE," all of which are incorporated herein by reference in their entireties.

FIELD OF THE INVENTION

The present invention generally relates to a seating arrangement for a powered passenger vehicle that is particularly suitable for fitment to a vehicle having small overall dimensions.

BACKGROUND OF THE INVENTION

A common problem faced by modern car users is the lack of parking space in cities and large towns. In an effort to provide more parking there has been a trend by local authorities to reduce the size of parking bays so as to provide more parking bays along a given length of road.

SUMMARY OF THE INVENTION

According to one aspect of the present invention, a vehicle seating assembly includes a front seat having a backrest and a squab. A rear seat includes a backrest and a squab. The front seat and rear seat are arranged in a staggered duplex overlapping relationship. A portion of a front edge of the rear seat squab overlaps a portion of a rear edge of the front seat squab. An inboard edge of the rear seat squab overlaps a portion of an inboard edge of the front seat squab. A longitudinal distance is measured from a front edge of the front seat squab to a rear edge of the rear seat squab is less than the sum of the longitudinal lengths of the front and rear seat squabs. A transverse distance is measured from an outboard edge of the front seat squab to an outboard edge of the rear seat squab is less than the sum of the widths of the front and rear seat squabs.

According to another aspect of the present invention, a vehicle seating assembly includes a front seat and a rear seat, each having a squab. The front and rear seats are arranged in a staggered duplex overlapping relationship. A portion of a front edge of the rear seat squab overlaps a portion of a rear edge of the front seat squab. An inboard edge of the rear seat squab overlaps a portion of an inboard edge of the front seat squab.

According to yet another aspect of the present invention, a vehicle seating assembly includes a backrest frame having a pair of uprights connected at a lower end via a backrest recline mechanism to a seat pan structure. A backrest adjuster is included in the backrest recline mechanism. Two pairs of arms pivotally connected together by the backrest adjuster. One of the two pairs of arms are a pair of cranked arms arranged such that the distance between lower ends of the pair of uprights is less than the distance between positions where the backrest recline adjuster mechanism is attached to the seat pan structure.

Therefore in summary there is a need to provide a passenger motor vehicle that is relatively short and narrow so as to permit three of such vehicles to park nose-in in a single parking bay without causing an obstruction to passing traffic.

It is a first object of the invention to provide a seating arrangement to facilitate the production of a motor vehicle having small overall dimensions.

This invention relates to a seating arrangement for a passenger motor vehicle including a front seat having a backrest and a squab and a rear seat having a backrest and a squab wherein the front and rear seats are arranged in a staggered duplex partially overlapping relationship such that at least part of a front edge of the rear seat squab overlaps with at least part of a rear edge of the front seat squab and at least part of an inboard edge of the rear seat squab overlaps with at least part of an inboard edge of the front seat squab.

A longitudinal distance between a front edge of the front seat squab and a rear edge of the rear seat squab is less than the sum of the lengths of the front and rear seat squabs and a transverse distance between an outboard edge of the front seat squab and an outside edge of the rear seat squab is less than the sum of the widths of the front and rear seat squabs.

At least a front inboard corner of the rear seat squab may be relieved so as to allow a front part of the rear seat squab to extend past a rear edge of the front seat squab.

The front inboard corner of the rear seat squab may have a cut-out so as to provide the relief to allow the front part of the rear seat squab to extend past the rear edge of the front seat squab.

The inboard edge of the rear seat may have a tapered form so as to reduce the width of the front edge of the rear seat squab and provide the relief to allow the front part of the rear seat squab to extend past the rear edge of the front seat squab.

The inboard edge of the rear seat may have a convex curved form so as to reduce the width of the front edge of the rear seat squab and provide the relief to allow the front part of the rear seat squab to extend past the rear edge of the front seat squab.

Both front corners of the rear seat squab may be relieved.

At least a rear inboard corner of the front seat squab may be relieved so as to allow the front part of the rear seat squab to extend past a rear edge of the front seat squab.

Both rear corners of the front seat squab may be relieved.

At least the front seat has a backrest that is cutaway at a lower inboard corner to provide space for a leg of a passenger seated on the rear seat.

The seating arrangement may advantageously include a front seat having a squab that has convex curved inboard and outboard edges and a backrest that is cutaway at a lower inboard corner to provide space for a leg of a passenger seated on the rear seat and a rear seat having a backrest and a squab that has convex curved inboard and outboard edges, the front and rear seats being positioned laterally and longitudinally with respect to one another to produce the staggered duplex partial overlapping relationship.

The front seat may have a seat pan structure and a backrest recline adjuster mechanism and the backrest recline adjuster mechanism may include a backrest adjuster that is narrower than the overall width of the seat pan structure to which the backrest adjustment mechanism is attached so as to provide space for a leg of a passenger seated on the rear seat to pass by one side of the front seat.

According to a second aspect of the invention there is provided a seat frame assembly for a seat of a seating arrangement constructed in accordance with said first aspect of the invention in which the seat frame assembly includes a backrest frame having a pair of uprights each of which is connected at a lower end via a backrest recline adjuster mechanism to a seat pan of the seat frame assembly, the backrest recline adjuster mechanism including two pairs of arms pivotally connected together by means of a backrest adjuster wherein one of the two pairs of arms is a pair of cranked arms arranged such that the distance between the lower ends of the two uprights is less than the distance between the positions where the backrest recline adjuster mechanism is attached to the seat pan.

According to a third aspect of the invention there is provided a compact motor vehicle having a source of motive power and a passenger compartment in which is located a seating arrangement constructed in accordance with said first aspect of the invention.

According to a fourth aspect of the invention there is provided a motor vehicle seat frame assembly including a backrest frame having a pair of uprights each of which is connected at a lower end via a backrest recline adjuster mechanism to a seat pan structure of the seat frame assembly, the backrest recline adjuster mechanism including a backrest adjuster and two pairs of arms pivotally connected together by the backrest adjuster wherein one of the two pairs of arms is a pair of cranked arms arranged such that the distance between the lower ends of the two uprights is less than the distance between the positions where the backrest recline adjuster mechanism is attached to the seat pan structure.

The backrest adjuster may be narrower than the overall width of the seat pan structure to which the backrest recline adjuster mechanism is attached.

The seat may be a front seat arranged in a forward and offset position with respect to a rear seat.

These and other aspects, objects, and features of the present invention will be understood and appreciated by those skilled in the art upon studying the following specification, claims, and appended drawings.

BRIEF DESCRIPTION OF THE DRAWINGS

The invention will now be described by way of example with reference to the accompanying drawing of which.

DETAILED DESCRIPTION OF THE EMBODIMENTS

Figure 1:
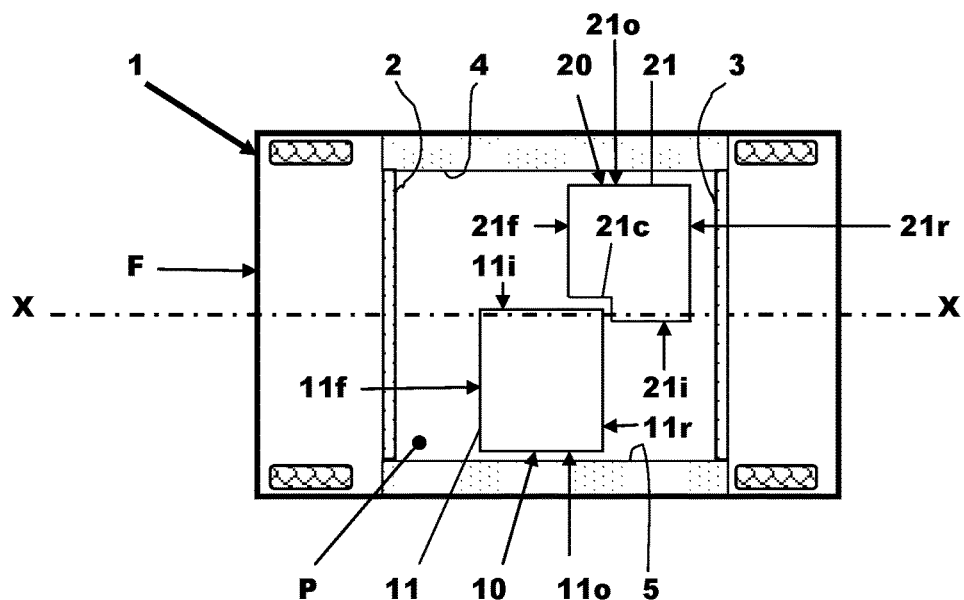
FIG. 1 is a diagrammatic plan view of a compact passenger road motor vehicle showing a first embodiment of a seating arrangement according to a first aspect of the invention located in a passenger compartment of the motor vehicle.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to FIG. 1 there is shown a first embodiment of a compact passenger motor vehicle 1 having a front end 'F', a longitudinal central axis X-X and a passenger compartment P defined by front, rear, and side walls 2, 3 and 4, 5. The vehicle 1 has a source of motive power that can be of any suitable known kind including wheel motors that can be located in any suitable position.

A seating arrangement for two occupants is provided in the form of a front seat 10 and a rear seat 20 arranged in a staggered duplex partial overlapping relationship within the passenger compartment.

The front seat 10 has seat cushion or squab 11 and a backrest. The front seat squab 11 has a front edge 11f, a rear edge 11r, an inboard edge 11i and an outboard edge 11o and is positioned forward in the passenger compartment P so as to be located as close as practicable to the front wall 2.

The length of the front seat squab 11 is the distance between the front and rear edges 11f and 11r of the front seat squab 11 and the width of the front seat squab 11 is the distance between the inboard and outboard edges 11i and 11o of the front seat squab 11.

The rear seat 20 has seat cushion or squab 21 and a backrest. The rear seat squab 21 has a front edge 21f, a rear edge 21r, an inboard edge 21i and an outboard edge 21o and is positioned towards the rear of the passenger compartment P such that the rear wall 3 is located as close as practicable to the rear edge 21r of the rear seat squab 21.

The length of the rear seat squab 21 is the distance between the front and rear edges 21f and 21r of the rear seat squab 21 and the width of the rear seat squab 21 is the distance between the inboard and outboard edges 21i and 21o of the rear seat squab 21.

Minimizing the distance between the front and rear walls 2 and 3 is advantageous if a short vehicle is used and is affected by the overall length of the seating arrangement. Similarly, minimizing the distance between the side walls 4 and 5 is advantageous if a narrow vehicle is used and is affected by the overall width of the seating arrangement. Therefore minimizing the overall length and width of the seating arrangement is advantageous if a trying to produce a very compact motor vehicle.

A front inboard corner of the rear seat squab 21 has a cut-out 21c to provide a relief for the front part of the rear seat squab 21 to extend past the rear edge 11r of the front seat squab 11. In this case the cut-out 21c is produced by the removal of a rectangular shaped portion of the front inboard corner of the rear seat squab 21.

The relief of the rear seat squab 21 facilitates the duplex partial overlapping of the front and rear seat squabs 11 and 21. This duplex partial overlapping allows at least part of the front edge 21f of the rear seat squab 21 to overlap with at least part of the rear edge 11r of the front seat squab 11 and at least part of the inboard edge 21i of the rear seat squab 21 to overlap with at least part of the inboard edge 11i of the front seat squab 11.

By positioning the front and rear seats 10 and 20 in such a duplex partial overlapping manner the overall width and length of the seating arrangement is reduced compared to the situation where there is no overlap and the seats 10, 20 are of the same dimensions.

When arranged in a duplex partial overlapping manner a longitudinal distance between a front edge 11f of the front seat squab 11 and a rear edge 21r of the rear seat squab 21 is less than the sum of the lengths of the front and rear seat squabs 11 and 21 and a transverse distance between an outboard edge 11o of the front seat squab 11 and an outside edge 21o of the rear seat squab 21 is less than the sum of the widths of the front and rear seat squabs 11 and 21.

Therefore a very compact seating arrangement is provided that enables a motor vehicle to be produced that can be parked nose-in in a standard parking bay and for three of such vehicles to be parked side by side in the parking bay.

Although FIG. 1 shows the two seats 10 and 20 arranged in a left hand drive arrangement with the front seat being on the left hand side of the vehicle it will be appreciated that it could also be used in a right hand drive vehicle in which case the front seat would be on the right hand side of the vehicle.

Figure 2:
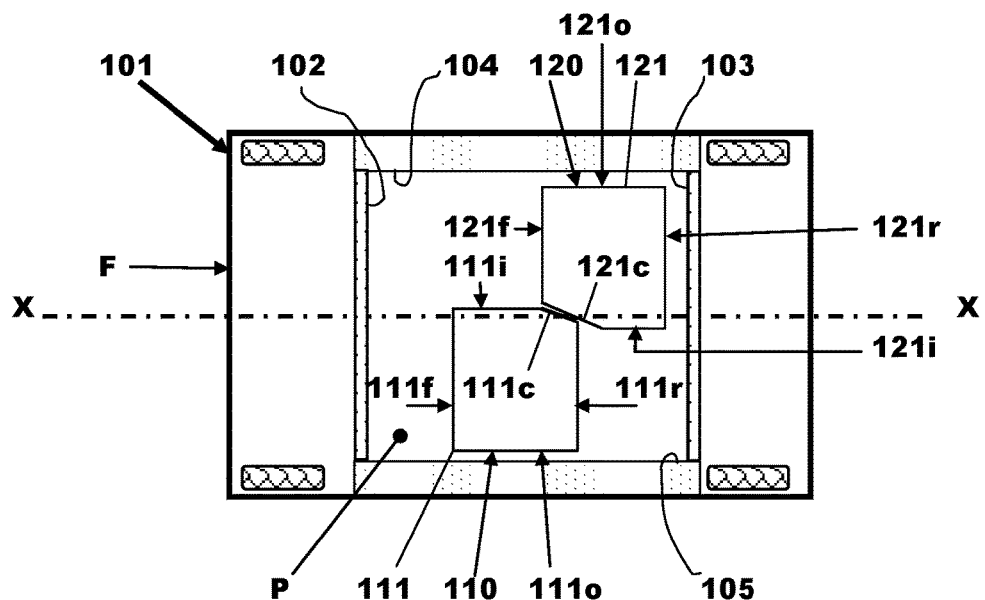
FIG. 2 is a diagrammatic plan view of the compact passenger road motor vehicle shown in FIG. 1 but showing a second embodiment of a seating arrangement according to the first aspect of the invention located in the passenger compartment of the motor vehicle.

With reference to FIG. 2 there is shown a second embodiment of a compact passenger motor vehicle 101 having a front end 'F', a longitudinal central axis X-X and a passenger compartment P defined by front, rear, and side walls 102,103 and 104,105. The rear wall 103 may be a fixed or moveable wall and delineates the passenger compartment P from an adjacent rear compartment which is often a luggage compartment. The vehicle 101 has a source of motive power that can be of any suitable known kind including wheel motors that can be located in any suitable position.

A seating arrangement for two occupants is provided in the form of a front seat 110 and a rear seat 120 arranged in a staggered duplex partial overlapping relationship within the passenger compartment.

The front seat 110 has seat cushion or squab 111 and a backrest. The front seat squab 111 has a front edge 111f, a rear edge 111r, an inboard edge 111i and an outboard edge 111o and is positioned forward in the passenger compartment P so as to be located as close as practicable to the front wall 102. It will be appreciated that the spacing of the front seat 110 from the front wall 103 depends upon the amount of room to comfortably accommodate the legs of a driver that will occupy the front seat 110 in use.

The length of the front seat squab 111 is the distance between the front and rear edges 111f and 111r of the front seat squab 111 and the width of the front seat squab 111 is the distance between the inboard and outboard edges 111i and 111o of the front seat squab 111.

The rear seat 120 has seat cushion or squab 121 and a backrest. The rear seat squab 121 has a front edge 121f, a rear edge 121r, an inboard edge 121i and an outboard edge 121o and is positioned towards the rear of the passenger compartment P so as to be located as close as practicable to the rear wall 3.

The length of the rear seat squab 121 is the distance between the front and rear edges 121f and 121r of the rear seat squab 121 and the width of the rear seat squab 121 is the distance between the inboard and outboard edges 121i and 121o of the rear seat squab 121.

A front inboard corner of the rear seat squab 121 has a cut-out 121c to provide a relief for the front part of the rear seat squab 121 to extend past the rear edge 111r of the front seat squab 111. In this case the cut-out 121c is produced by the removal of a triangular shaped portion of the front inboard corner of the rear seat squab 121 so that the inboard edge 121i of the rear seat squab 121 has a tapered form so as to reduce the width of the front edge 121f of the rear seat squab 121 and provide the relief to permit the front part of the rear seat squab 121 to extend past the rear edge 111r of the front seat squab 111.

In this second embodiment a rear inboard corner of the front seat squab 111 is also relieved so as to assist the front part of the rear seat squab 121 to extend past the rear edge 111r of the front seat squab 111. The relief is provided by using a tapered form for a rear part of the inside edge 111i of the front seat squab 111 so as to reduce the width of the rear edge 111r of the front seat squab 111.

The reliefs of the front and rear seat squabs 111, 121 facilitate the duplex partial overlapping of the front and rear seat squabs 111 and 121. As before, the duplex partial overlapping allows at least part of the front edge 121f of the rear seat squab 121 to overlap with at least part of the rear edge 111r of a squab of the front seat squab 111 and at least part of the inboard edge 121i of the rear seat squab 121 to overlap with at least part of the inboard edge 111i of the front seat squab 111.

By positioning the front and rear seats 110 and 120 in such a duplex partial overlapping manner the overall width and length of the seating arrangement is reduced compared to the situation where there is no overlap and the seats 110, 120 are of the same dimensions. This reduction in overall length and width of the seating arrangement provides an opportunity for reducing the overall length and width of the motor vehicle in which the seats are mounted.

By arranging the two seats 110, 120 in a duplex partial overlapping manner a longitudinal distance between a front edge 111f of the front seat squab 111 and a rear edge 121r of the rear seat squab 121 is less than the sum of the lengths of the front and rear seat squabs 111 and 121 and a transverse distance between an outboard edge 111o of the front seat squab 111 and an outside edge 121o of the rear seat squab 121 is less than the sum of the widths of the front and rear seat squabs 111 and 121.

Therefore, as before, a very compact seating arrangement is provided that enables a motor vehicle to be produced that can potentially be parked nose-in in a standard parking bay and for three of such vehicles to be parked side by side in the parking bay.

Although FIG. 2 shows the two seats 110 and 120 arranged for left hand drive it will be appreciated that it could also be adapted for use in a right hand drive vehicle.

Figure 3:
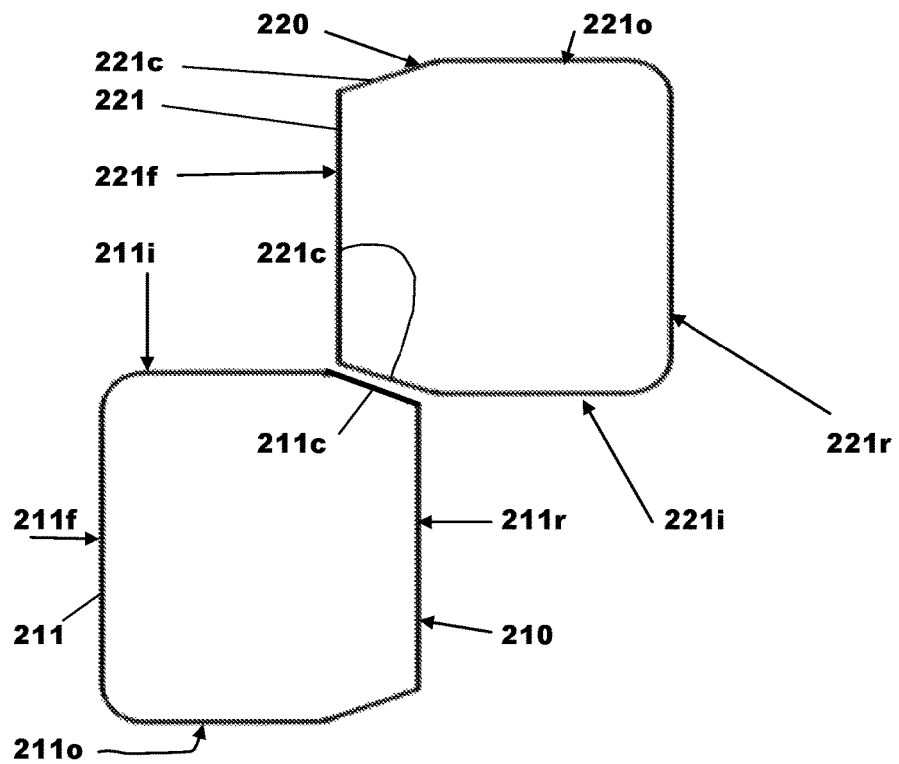
FIG. 3 is a diagrammatic plan view of a third embodiment of a seating arrangement according to the first aspect of the invention in which squab parts of the respective seats are shown.

With reference to FIG. 3 there is shown a third embodiment of seating arrangement that is intended to be a direct replacement for the seating arrangements shown in FIGS. 1 and 2.

As before, the seating arrangement for two occupants is provided in the form of a front seat 210 and a rear seat 220 arranged in a staggered duplex partial overlapping relationship within the passenger compartment.

The front seat 210 has a seat cushion or squab 211 and a backrest. The front seat squab 211 has a front edge 211f, a rear edge 211r, an inboard edge 211i and an outboard edge 211o and is positioned forward in the passenger compartment so as to be located as close as practicable to a front wall of the motor vehicle in which it is fitted.

The length of the front seat squab 211 is the distance between the front and rear edges 211f and 211r of the front seat squab 211 and the width of the front seat squab 211 is the distance between the inboard and outboard edges 211i and 211o of the front seat squab 211.

The rear seat 220 has a cushion or squab 221 and a backrest. The rear seat squab 221 has a front edge 221f, a rear edge 221r, an inboard edge 221i and an outboard edge 221o and is positioned towards the rear of the passenger compartment P so as to be located as close as practicable to the rear wall 3.

The length of the rear seat squab 221 is the distance between the front and rear edges 221f and 221r of the rear seat squab 221 and the width of the rear seat squab 221 is the distance between the inboard and outboard edges 221i and 221o of the rear seat squab 221.

In this embodiment both front corners of the rear seat squab 221 have respective cut-outs 221c. The inboard cut-out 221c provides the relief for the front part of the rear seat squab 221 to extend past the rear edge 211r of the front seat squab 211 and the outboard cut-out 221c is provided to enable the rear seat squab 221 to also be used on a right hand drive vehicle when the cut-out will be the inboard cut-out. In this case both of the cut-outs 221c are produced by the removal of a triangular shaped portion of the front corners of the rear seat squab 221 so that the inboard and outboard edges 221i and 221o of the rear seat squab 221 both have a tapered form so as to reduce the width of the front edge 221f of the rear seat squab 221.

With this embodiment both rear corners of the front seat squab 211 have respective cut-outs 211c, the inboard cut-out 211c is to provide the relief enabling the front part of the rear seat squab 221 to extend past the rear edge 211r of the front seat squab 211 and the outboard cut-out 211c is provided to enable the front seat squab 211 to also be used on a right hand drive vehicle when the cut-out will be the inboard cut-out. The cut-outs 211c are produced by the removal of a triangular shaped portion of the rear corners of the front seat squab 211 so that the inboard and outboard edges 211i and 211o of the front seat squab 211 both have a tapered form and reduce the width of the rear edge 211r of the front seat squab 211

The reliefs on the front and rear seat squabs 211 and 221 facilitate the duplex partial overlapping of the front and rear seat squabs 211 and 221. The duplex partial overlapping utilizes at least part of the front edge 221f of the rear seat squab 221 to overlap with at least part of the rear edge 211r of a squab of the front seat squab 211 and at least part of the inboard edge 221i of the rear seat squab 221 to overlap with at least part of the inboard edge 211i of the front seat squab 211.

By positioning the front and rear seats 210 and 220 in such a duplex partial overlapping manner the overall width and length of the seating arrangement is reduced compared to the situation where there is no overlap and the seats 210, 220 are of the same dimensions and so is advantageous in that the length and width of the motor vehicle can potentially be reduced.

When the two seats 210, 220 are arranged in a duplex partial overlapping manner, a longitudinal distance between a front edge 211f of the front seat squab 211 and a rear edge 221r of the rear seat squab 221 is less than the sum of the lengths of the front and rear seat squabs 211 and 221 and a transverse distance between an outboard edge 211o of the front seat squab 211 and an outside edge 221o of the rear seat squab 221 is less than the sum of the widths of the front and rear seat squabs 211 and 221.

Therefore, as before, a very compact seating arrangement is provided that potentially enables a motor vehicle to be produced that can be parked nose-in in a standard parking bay and for three of such vehicles to be parked side by side in the parking bay.

Although FIG. 3 shows the two seats 210 and 220 arranged for left hand drive it will be appreciated that it could also be adapted for use in a right hand drive vehicle.

Figure 4:
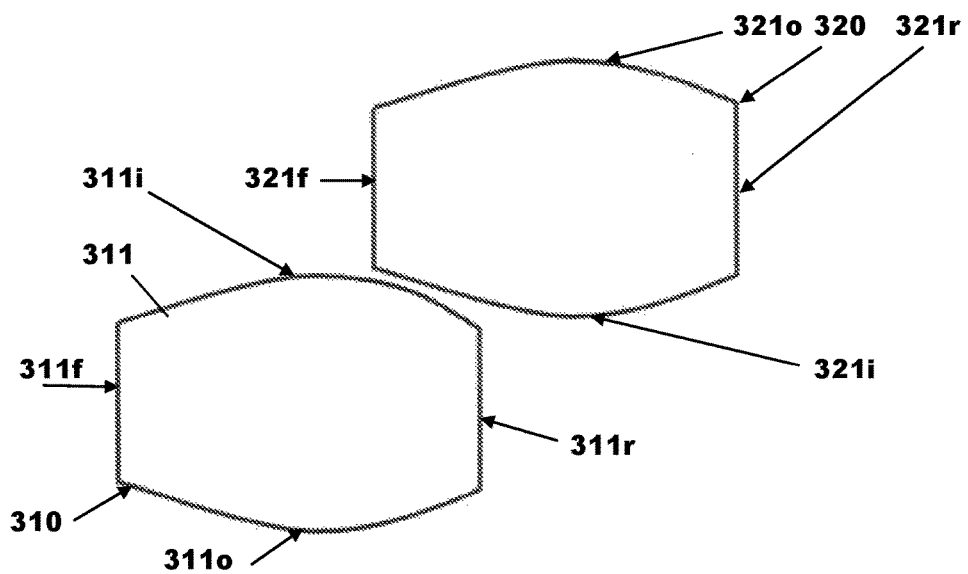
FIG. 4 is a diagrammatic plan view of a fourth embodiment of a seating arrangement according to the first aspect of the invention in which squab parts of the respective seats are shown.
Figure 5:
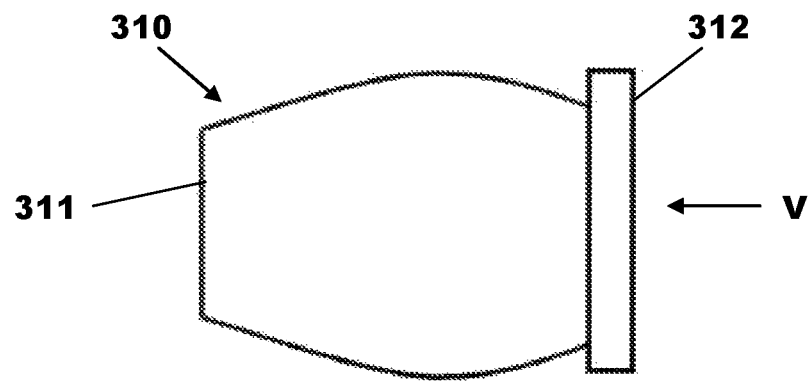
FIG. 5 is a diagrammatic plan view of a front seat of the two seats shown in FIG. 4 showing both the seat squab and a backrest.
Figure 6:
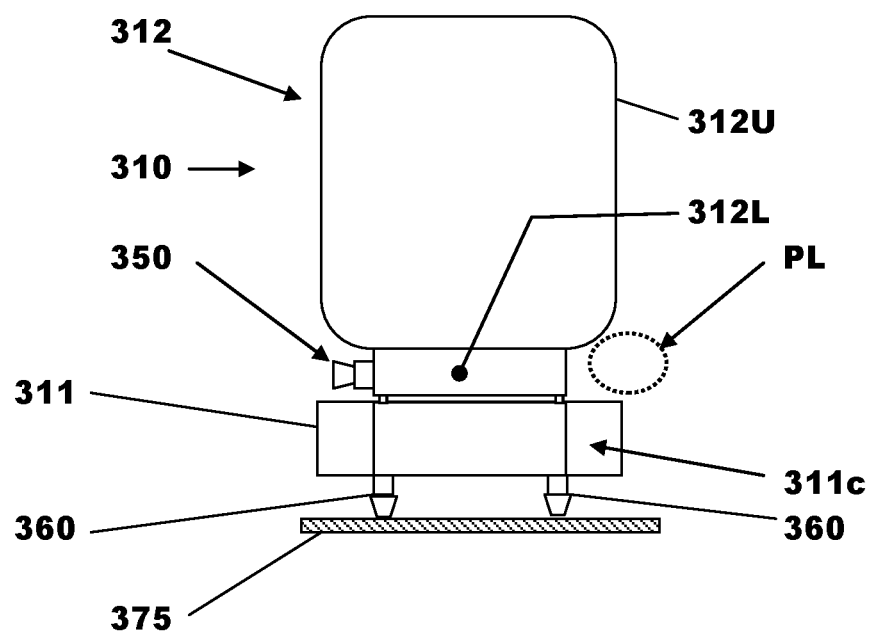
FIG. 6 is a diagrammatic rear elevational view of the seat shown in FIG. 5 as viewed in the direction of arrow 'V' on FIG. 5.

With reference to FIGS. 4-6 there is shown a fourth embodiment of seating arrangement that is intended to be a direct replacement for the seating arrangements shown in FIGS. 1 and 2. Although FIG. 4 shows the two seats 310 and 320 arranged for left hand drive it will be appreciated that it could also be adapted for use in a right hand drive vehicle.

As before, the seating arrangement for two occupants is provided in the form of a front seat 310 and a rear seat 320 arranged in a staggered duplex partial overlapping relationship within the passenger compartment.

The front seat 310 has a seat cushion or squab 311 and a backrest 312. The front seat squab 311 has a front edge 311f, a rear edge 311r, an inboard edge 311i and an outboard edge 311o and is positioned forward in the passenger compartment so as to be located as close as practicable to a front wall of the motor vehicle in which it is fitted.

The length of the front seat squab 311 is the distance between the front and rear edges 311f and 311r of the front seat squab 311 and the width of the front seat squab 311 is the maximum distance between the inboard and outboard edges 311i and 311o of the front seat squab 311.

The rear seat 320 has seat cushion or squab 321. The rear seat squab 321 has a front edge 321f, a rear edge 321r, an inboard edge 321i and an outboard edge 321o and is positioned towards the rear of the passenger compartment P so as to be located as close as practicable to the rear wall 3.

The length of the rear seat squab 321 is the distance between the front and rear edges 321f and 321r of the rear seat squab 321 and the width of the rear seat squab 321 is the maximum distance between the inboard and outboard edges 321i and 321o of the rear seat squab 321.

In this embodiment the front and rear seat squabs 310 and 320 both have all corners relieved by having respective convex curved inboard and outboard side edges 311i, 321i and 311o, 321o.

This provides a seat squab 310, 320 that has a reduced width at both its front edge 310f, 320f and its rear edge 310r, 320r.

One advantage of such an arrangement is that the same seat squab can be used for front and rear seats 310 and 320 and also for left hand and right hand drive vehicles thereby reducing manufacturing complexity and costs.

The length of the front seat squab 311 is the distance between the front and rear edges 311f and 311r of the front seat squab 311 and the width of the front seat squab 311 is the distance between the inboard and outboard edges 311i and 311o of the front seat squab 311 at its widest position.

The length of the rear seat squab 321 is the distance between the front and rear edges 321f and 321r of the rear seat squab 321. The width of the rear seat squab 321 is the distance between the inboard and outboard edges 321i and 321o of the rear seat squab 321 at its widest position.

The inboard reliefs at the front of the rear seat squab 321 and the rear of the front seat squab 311 facilitate the duplex partial overlapping of the front and rear seat squabs 311 and 321. As before, the duplex partial overlapping utilizes at least part of the front edge 321f of the rear seat squab 321 to overlap with at least part of the rear edge 311r of a squab of the front seat squab 311 and at least part of the inboard edge 321i of the rear seat squab 321 to overlap with at least part of the inboard edge 311i of the front seat squab 311.

The other reliefs are utilized if the seat squabs 311, 321 are arranged in different positions. For example the seat squabs could be used in a right hand drive vehicle instead of a left hand drive vehicle or their position is swopped with the front seat squab being used as a rear seat squab and vice-versa.

By positioning the front and rear seats 310 and 320 in such a duplex partial overlapping manner, the overall width and length of the seating arrangement is reduced compared to the situation where there is no overlap and the seats 310, 320 are of the same dimensions.

For example, in one example of such a seating arrangement the overall length of the seating arrangement was reduced from 1.265 m if the two seats are positioned one behind the other with no overlap. Made up of a seat squab length of 0.59 m for both squabs and a longitudinal stagger distance of 0.675 m). An overall length of 0.92 m was achieved using seat squabs of the same length and a longitudinal stagger distance of 0.33 m and a longitudinal overlap of 0.26 m.

The overall width of the same seating arrangement was reduced from 1.08 mm when the two seats where positioned side by side with no overlap to 0.755 m using a transverse overlap of 0.125 m and seat squabs of 0.44 m width. A seat centerline to vehicle centerline distance for a conventional side by side seat city car is typically 0.32 m. This means that the distance between the centerlines of the two seat squabs of a conventional city car is typically 0.64 m resulting in an overall width for the seating arrangement of (0.22+0.22+0.64=1.08 m). The overall width for a duplex partial overlapping seating arrangement in accordance with one embodiment of this invention was reduced by using a centerline lateral seat spacing of 0.315 m made up of 0.175 m for the driver squab and 0.140 m passenger squab. The duplex partial overlapping arrangement therefore produced a reduction in overall width of 0.325 m using 0.44 wide seat squabs. Of this gain 0.125 m is due to the transverse overlap ((0.22−0.175)+(0.22−0.14))=0.125 m and the rest is due to the fact that the longitudinal stagger allows the inboard shoulders of the two occupants to be overlapped.

As before, when the seats 310, 320 are arranged in a duplex partial overlapping manner a longitudinal distance between a front edge 311f of the front seat squab 311 and a rear edge 321r of the rear seat squab 321 (0.59+0.33 m=0.92 m) is less than the sum of the lengths of the front and rear seat squabs 311 and 321 (0.59=0.59=1.180 m) a gain of 0.26 m and a transverse distance between an outboard edge 3110 of the front seat squab 311 and an outside edge 321o of the rear seat squab 321 (0.22 m+0.175 m+0.22 m+0.14 m=0.755 m) is less than the sum of the widths of the front and rear seat squabs 311 and 321 (0.44 m+0.44 m=0.88 m) a gain of 0.125 m.

Therefore, as before, a very compact seating arrangement is provided that enables a motor vehicle to be produced that can be parked nose in in a standard parking bay and for three of such vehicles to be parked side by side in the parking bay.

In FIG. 6 the position of a left leg PL of a rear seated passenger is indicated by a dotted oval. It can be seen that the backrest 312 has a wide upper part 312U and a narrower lower part 312L. Therefore the backrest 312 of the front seat 310 is cutaway at lower inboard and outboard corners so as to produce the wide upper backrest 312U and narrow lower backrest 312L shape. It will be appreciated that the backrest 312 could be formed of two separate parts having differing widths.

The inboard cutaway provides space for the leg PL of a passenger seated on the rear seat to extend past the front seat 310.

A recline adjuster mechanism 350 for adjusting the angle between the front seat backrest 312 and the rear seat squab 311 is also shown on FIG. 6. The cutaway on the outboard lower corner of the front seat backrest 312 allows the accommodation of the recline adjuster mechanism 350 without increasing the overall width of the front seat 310. That is to say, because the lower part 312L of the backrest 312 is narrower than the upper part 312U, there is room to accommodate the recline adjuster mechanism 350 in the cutaway without increasing the overall width of the front seat 310.

The front seat 310 is shown mounted onto a floor 375 of a motor vehicle, such as the motor vehicle 1 or the motor vehicle 101, by means of a fore-aft position adjuster 360. Such position adjusters are well known in the art.

It will be appreciated that if the rear seat 320 is turned outwardly by a small amount such as but not limited to 1 or 2 degrees and the front seat 310 is turned inwardly by a similar small amount then increased room for the leg PL if the passenger can be obtained. However, in such a case, unless relief is provided on the outboard sides of the squabs then the width of the passenger compartment would potentially increase when the seats are rotated due to their elongate shape.

If relief is provided both inboard and outboard for such a seat and the seats are rotated as described above, it is possible to reduce the overall width of the passenger compartment even further compared to a case where both seats are arranged parallel to the longitudinal axis of the vehicle.

Figure 7A:
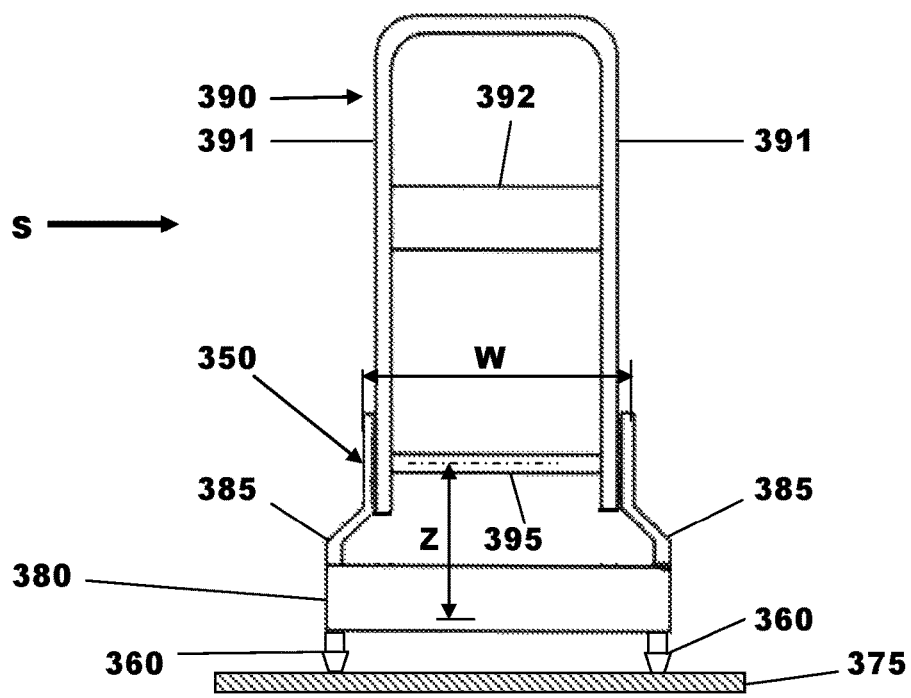
FIG. 7a is a rear elevational view showing a seat frame assembly for a seat.
Figure 7B:
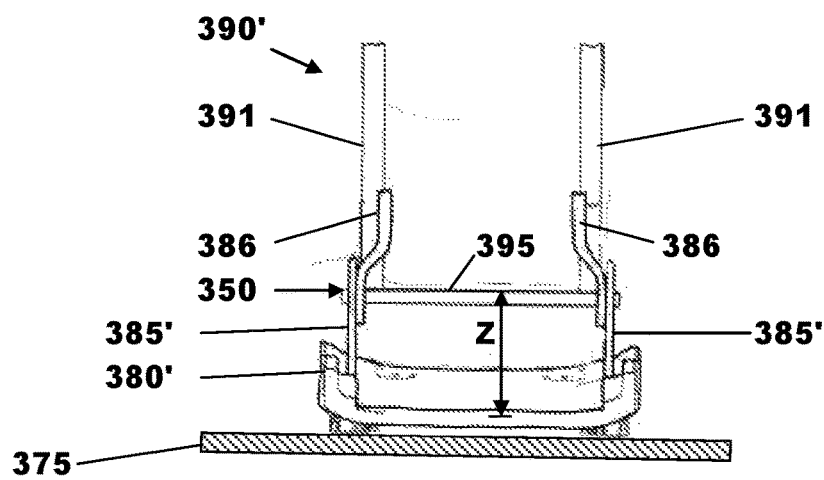
FIG. 7b is a rear partial elevational view of a seat frame assembly.
Figure 8:
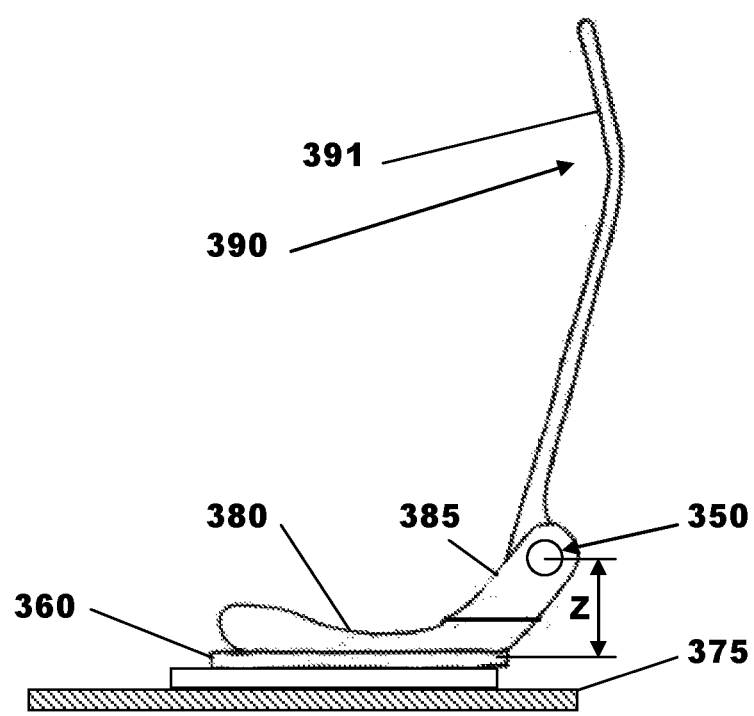
FIG. 8 is a side view in the direction of arrow 'S' on FIG. 7a of the seat frame assembly.

With particular reference to FIGS. 7a, 7b, and 8 there is shown a seat frame assembly for use in a seat such as the front seat 310 shown in FIGS. 4-6. It will be appreciated that the same construction could be used for a rear seat.

With particular reference to FIG. 7a the seat frame assembly includes an inverted U-shape backrest frame 390 having a pair of uprights 391. Each of the uprights 391 is pivotally connected at a lower end via a pivot rod 395 forming part of a backrest adjuster to an upper end of a respective one of a pair of upstanding arms 385.

A cross-rail 392 is provided to strengthen the backrest frame 390 which could be a single piece component or could be fabricated from several parts that are fastened together.

Each of the upstanding arms 385 is attached at a lower end to a seat pan structure 380 of the seat frame assembly. The seat pan structure 380 is mounted on the floor 375 by means of the fore-aft position adjuster 360.

A backrest recline adjuster mechanism, is provided to control the angular displacement of the backrest frame 390 relative to the seat pan structure 380. The backrest adjuster mechanism 350 includes the two pairs of arms and a backrest adjuster having components interposed between the two pairs of arms linked via the pivot rod 395. One of the pairs of arms is connected to the uprights 391 and the other one of the two pairs is fastened to the seat pan structure 380 with the backrest adjuster interposed therebetween. In this case the pair of upstanding arms 385 is fastened to the seat frame and a second pair of arms is fastened to the uprights 391.

Each of the upstanding arms 385 is a cranked arm so that the distance between upper ends of the two upstanding arms 385 is less than the distance between lower ends of the two upstanding arms 385 where the two upstanding arms 385 join the seat pan structure 380. The waisted arrangement of the upstanding arms 385, the narrow width of the backrest frame 390 at its lower end and the narrow width "W" of the backrest adjuster are advantageous in that they enable the front seat 310 to be provided with the cutaway shaped backrest 312 shown in FIG. 6 which provides space for the leg PL of the passenger as it passes by the inboard side of the front seat 310.

A vertical distance "Z" from an internal surface of the seat pan structure 380 (submarine panel) to a rotational centerline of the pivot rod 395 is set by the lengths of the cranked arms 385 to be above the position where the hips of a person sat on the seat would be positioned in use. This is done so as to avoid discomfort to the person sat on the seat due to the presence of the backrest recline adjuster mechanism and in particular the backrest adjuster and also to provide extra clearance for the leg PL of the passenger as it passes by the inboard side of the front seat 310.

The seat frame shown in FIGS. 7b and 8 is in most respects the same as that previously described with respect to FIG. 7a. As before a backrest adjuster mechanism including a backrest adjuster is used to control the angular position between two pairs of arms, that is to say, it is interposed therebetween. The primary difference between this embodiment and that previously described is that two cranked arms 386 forming one of the two pairs of arms are in this case fastened to the two uprights 391 of the seat frame 390' rather than to the seat pan 380'. The backrest adjuster mechanism is in this case connected to the seat pan structure 380' by two substantially planar arms 385' forming the second pair of arms rather than by cranked arms as is the case with the embodiment of FIG. 7a.

As before the width of the seat frame 390' is less than the width of the seat pan structure 380' and the backrest recline adjuster mechanism and in particular the backrest adjuster is narrower than the seat pan structure 380'. The backrest adjuster is as before positioned higher than normal at a position "Z" above a lower part of the seat pan structure 380' so as to avoid discomfort for a user of the seat and also to provide extra clearance for the leg PL of the passenger as it passes by the inboard side of the front seat 310.

It will be appreciated that both pairs of arms could be cranked arms.

It will be appreciated that the amount of overlap between the front and rear seats in the transverse direction is limited by the need for the inboard leg of the passenger to be able to pass by the side of the front seat. The magnitude of the longitudinal overlap is at least partially limited by the need to provide adequate space between a rear seated passenger and a rear face of the front seat.

Therefore, a duplex partial overlapping arrangement is one where there is sufficient room for a passenger to comfortably occupy the rear seat and, for a $95^{th}$ percentile male to occupy the rear seat.

It will be appreciated by those skilled in the art that although the invention has been described by way of example with reference to one or more embodiments it is not limited to the disclosed embodiments and that alternative embodiments could be constructed without departing from the scope of the invention as defined by the appended claims.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is for illustrative purposes. Although a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown in multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of the wide variety of materials that provide sufficient strength or durability, in any of the wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is to be understood that variations and modifications can be made on the aforementioned structure and methods without departing from the concepts of the present invention, and further it is to be understood that such concepts are intended to be covered by the following claims unless these claims by their language expressly state otherwise.

What is claimed is:

1. A vehicle including only two vehicle seats and comprising:
   a front seat and a rear seat, each having a squab similar in size and arranged in a staggered duplex overlapping relationship;
   a front inboard edge of the rear seat squab including a tapered portion and overlapping a tapered portion of a rear inboard edge of the front seat squab;
   wherein the front and rear seats intersect a longitudinal central axis of said vehicle.

2. The vehicle of claim 1, wherein the front seat squab includes a front inboard edge with a tapered portion.

3. The vehicle of claim 1, wherein the rear seat squab includes a rear inboard edge with a tapered portion.

4. The vehicle of claim 1, wherein the tapered portion of the front inboard edge of the rear seat squab generally defines a cut-out so as to provide relief to allow a front part of the rear seat squab to extend past a rear part of the front seat squab.

5. The vehicle of claim 1, wherein the tapered portion of the front inboard edge of the rear seat squab generally defines a convex curved form so as to reduce the width of a front part of the rear seat squab and provide relief to allow the front part of the rear seat squab to extend past a rear part of the front seat squab.

6. The vehicle of claim 1, wherein only the rear inboard edge of the front seat squab is tapered and only the front inboard edge of the rear seat squab is tapered.

7. A two seat vehicle seating assembly for a vehicle, the assembly comprising:
   front and rear seats arranged in a staggered duplex overlapping relationship;
   a front edge of a rear seat squab overlapping a rear edge of a front seat squab;
   wherein the front and rear seats intersect a longitudinal central axis of said vehicle; and
   a first storage space disposed immediately behind the front seat and a second storage space disposed in front of the rear seat.

8. The two seat vehicle seating assembly of claim 7, wherein the front seat squab includes a front inboard edge with a tapered portion.

9. The two seat vehicle seating assembly of claim 7, wherein the rear seat squab includes a rear inboard edge with a tapered portion.

10. The two seat vehicle seating assembly of claim 8, wherein the tapered portion of the front inboard edge of the rear seat squab generally defines a cut-out so as to provide relief to allow a front part of the rear seat squab to extend past a rear part of the front seat squab.

11. The two seat vehicle seating assembly of claim 8, wherein the tapered portion of the front inboard edge of the rear seat squab generally defines a convex curved form so as to reduce the width of a front part of the rear seat squab and provide relief to allow the front part of the rear seat squab to extend past a rear part of the front seat squab.

12. The two seat vehicle seating assembly of claim 7, wherein a rear inboard edge of the front seat squab is tapered and a front inboard edge of the rear seat squab is tapered.

13. The two seat vehicle seating assembly of claim 7, wherein the front and rear seat squabs are substantially similar in size.

14. A vehicle including only two vehicle seats and comprising:
   a front seat and a rear seat that are similar in size and which are both slidably coupled with a vehicle floor and arranged in a staggered duplex overlapping relationship;
   a front inboard edge of the rear seat overlapping a rear inboard edge of the front seat;
   wherein the front and rear seats intersect a longitudinal central axis of said vehicle.

15. The vehicle of claim 14, wherein the front inboard edge of the rear seat generally defines a cut-out so as to provide relief to allow a front part of the rear seat to extend past a rear part of the front seat.

16. The vehicle of claim 14, wherein the front inboard edge of the rear seat generally defines a convex curved form so as to reduce the width of a front part of the rear seat and provide relief to allow the front part of the rear seat to extend past a rear part of the front seat.

17. The vehicle of claim 14, wherein a rear inboard edge of the front seat is tapered and a front inboard edge of the rear seat is tapered.

* * * * *